UNITED STATES PATENT OFFICE.

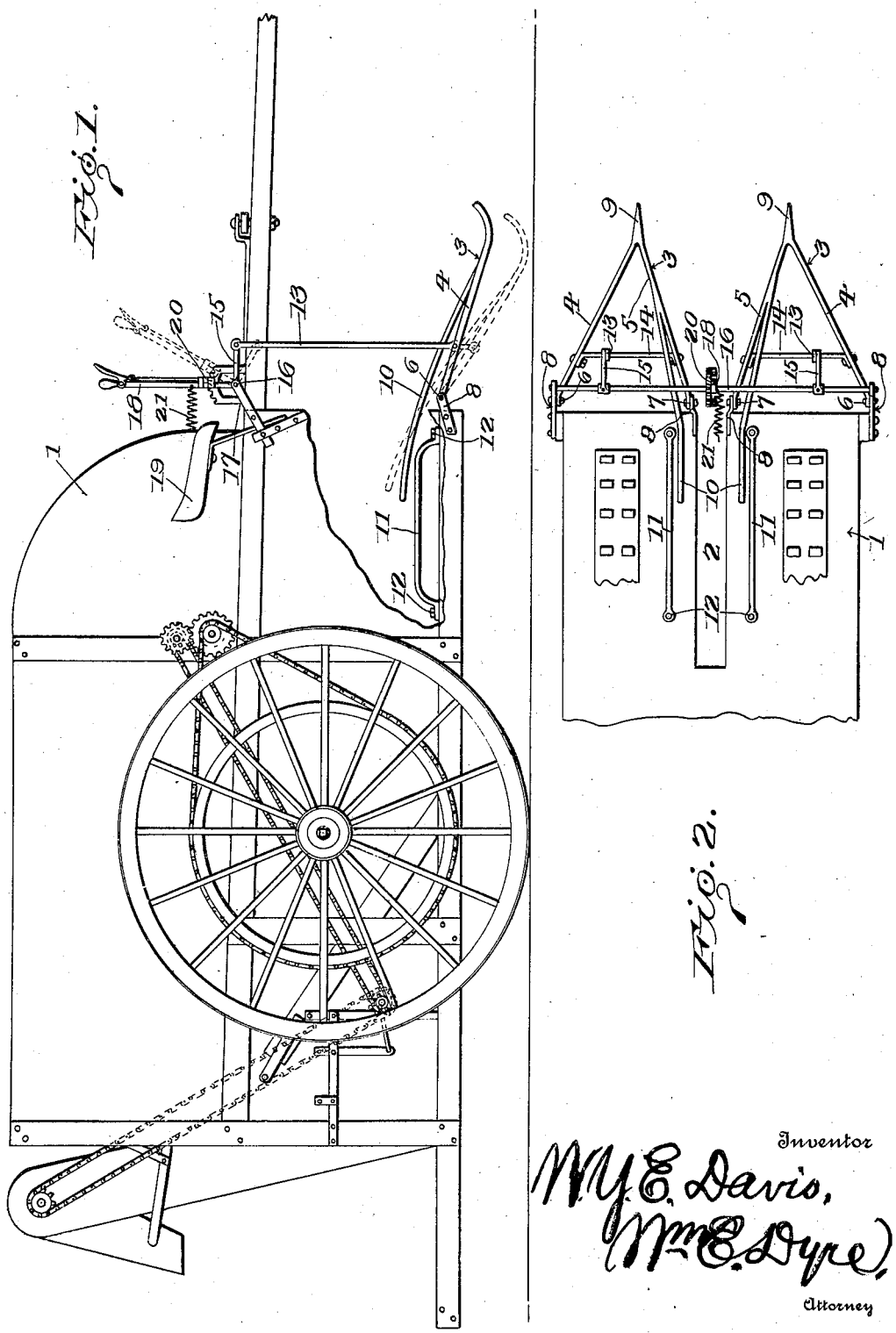

WILLIAM Y. E. DAVIS, OF BERKLEY, VIRGINIA.

PEA-HARVESTER.

1,359,794.     Specification of Letters Patent.     Patented Nov. 23, 1920.

Application filed January 26, 1920. Serial No. 354,278.

*To all whom it may concern:*

Be it known that I, WILLIAM Y. E. DAVIS, a citizen of the United States, residing at Berkley, in the county of Norfolk and State of Virginia, have invented certain new and useful Improvements in Pea-Harvesters; and I do hereby declare the following to be a full, clear, and exact description of the invention, such as will enable others skilled in the art to which it appertains to make and use the same.

This invention relates to certain new and useful improvements in harvesters and contemplates more particularly an elevating and guiding device for lifting fallen and rambling vines, spreading bushes and the like into the path of the threshing mechanism.

An object of the present invention is the production of a novel vine or bush gathering device especially adapted for pea harvesting whereby the produce to be threshed is elevated and guided into substantially a vertical position to be operated upon by the threshing member.

Another object of the invention is to produce a vine gathering device comprising movable frame sections arranged to pass beneath the vines preferably upon opposite sides of the plant and gradually lift them toward a central passageway onto relatively stationary guides into the path of the threshing member.

Another object of the invention is the production of a vine gathering device for pea harvesters and the like in which the vine lifting frames are simultaneously controlled by a spring tensioned lever, particularly adapting the present invention to that disclosed by U. S. Letters Patent No. 1,214,653 granted to me under date of February 6, 1917.

With these and other objects in view the invention further consists in the construction and arrangement of the several parts hereinafter described and pointed out in the appended claims.

In the accompanying drawings illustrating an embodiment of my invention:—

Figure 1 is a side elevation of my improved device as applied to a pea harvester, the lowermost position of the device being shown in dotted lines; and Fig. 2 is a top plan view of the invention illustrating but a portion of the harvester and the central passageway thereof leading to the usual threshing member.

The present invention, generally stated, comprises oppositely arranged frame sections both of which are pivotally mounted upon the forward end of the harvester and are simultaneously controlled by a lever preferably within distance of the operator's seat as shown. Guide arms or fingers extend from the frame sections and are disposed inwardly toward each other, projecting as shown longitudinally of the harvester in coöperative arrangement with relatively fixed guides upon each side of a central passageway. The fallen or rambling vines are first caught by the extreme ends of the frame sections and are subsequently guided upwardly and inwardly by the guide arms or fingers between and onto the relatively fixed and spaced guides where they are held in substantially a vertical position to be operated upon by the threshing member.

Referring to the drawings in which corresponding reference characters designate similar parts, a conventional harvester is shown at 1, embodying all of the usual operative features. A central passageway 2 is provided at the forward end of the harvester and it is into this opening that the vines are directed preparatory to the threshing operation.

Upon each side of the aforesaid passageway and at the forward end thereof, a movable frame section 3 is supported. Each frame section 3 comprises diverging brace rods 4 and 5 each of which is pivotally mounted at 6 and 7, respectively, in arms or brackets 8 secured to and projecting from the harvester frame. The brace rods 4 and 5 converge at their forward ends into curved vine engaging ends or portions 9 capable of passing beneath the fallen or rambling vines to elevate them sufficiently to be directed on to the guide arms or fingers 10.

Each guide arm or finger 10 is designed to extend inwardly from the vine engaging end portion 9, and may be formed integral with each of the frame sections 3, or may be attached thereto in any approved manner. The inner ends of guide arms or fingers 10 are preferably bent in parallelism as shown and are designed to overlap the relatively fixed guide members 11. The guide arms or fingers 10 are of a flexible or yielding construction, their inner ends being freely movable so as to adapt themselves to a reasonable degree of pressure sometimes caused by the irregular, tortuous and more or less tangled growth of the vines.

The relatively stationary or fixed guide members 11 are longitudinally arranged upon each side of the passageway 2 and are attached to the harvester as indicated at 12.

These guide members are positioned at a height designed to properly present the vines to the threshing member, and they are also coöperatively positioned in proper spaced relation to the inner ends of the guide arms or fingers 10, as shown.

The inner ends of the guide fingers 10 are arranged parallel to the guide arms 11 longitudinally of the harvester and project over or overlap the said guide arm 11 a sufficient distance to insure the complete transfer of the vines as will be understood.

The frame sections 3 are movably controlled by means of two links 13 each of which is attached to a cross bar 14 of each frame section, and to an arm 15 secured to a cross shaft 16. The cross shaft 16 is supported in bracket arms 17 secured to the harvester.

Secured to the cross shaft and arranged intermediate thereto is an actuating lever 18 preferably positioned within a convenient distance of the seat indicated at 19.

The actuating lever 18 is provided with a locking pawl and rack control 20 of any well known construction by means of which the lever can be locked in any desired position or left free to swing as will be understood.

A spring 21 is interposed between the actuating lever 18 and a fixed portion of the harvester for yieldingly holding the frame sections and guide fingers in a relatively normal operating position.

In operation the harvester is moved through the vines with the frame sections and lifting fingers in a position capable of passing beneath the vines and directing them upwardly along the inwardly inclined guide fingers 10, onto the relatively fixed guides 11. The vines are substantially bunched by the time they reach the parallel portions of the guide fingers 10, and as the harvester progresses over the field, the vines are transferred over the free ends of the fingers 10 to the stationary or fixed guides 11 where they are supported in a standing or substantially vertical position preparatory to being operated upon by the threshing member.

It will be seen that numerous adjustments can be obtained for vines of varying density and tenacity, and I do not limit myself to its adaptability to pea harvesting only. Likewise, various changes in the proportion and arrangement of parts may be resorted to without departing from the spirit of my invention and I do not limit myself to the exact form described herein.

I claim:—

1. In a harvester for gathering peas and the like, the combination with movable vine lifting and guiding members, of relatively fixed horizontally arranged guide members for receiving the vines from the said movable vine lifting and guiding members only through the advancing of the harvester and for retaining the vines in substantially a vertical position preparatory to being threshed.

2. In a harvester for gathering peas and the like, the combination with oppositely disposed vine lifting and guiding members, of relatively fixed and spaced guide members for receiving the vines from the said movable vine lifting and guiding members only through the advancing of the harvester and for retaining the vines in substantially vertical position, and means for moving the aforesaid vine lifting and guiding members.

3. In a harvester for gathering peas and the like, the combination with oppositely disposed vine lifting and guiding members, of relatively fixed and spaced guide members for receiving the vines from the said movable vine lifting and guiding members only through the advancing of the harvester and for retaining the vines in substantially vertical position, and means including a lever for moving the aforesaid vine lifting and guiding members simultaneously.

4. In a harvester for gathering peas and the like, the combination with oppositely disposed vine lifting and guiding members, of relatively fixed and spaced guide members for receiving the vines from the said movable vine lifting and guiding members and for retaining the vines in substantially vertical position, and means including a yieldingly controlled lever for moving the aforesaid vine lifting and guiding members.

5. In a harvester for gathering peas and the like, the combination with oppositely disposed and inwardly extending movable vine lifting and guiding members, of relatively fixed guide members for receiving the vines from the said vine lifting and guiding members only through the advancing of the harvester, said fixed guide members being arranged in substantially horizontal and parallel relation to each other and spaced a distance proportionate to that of the aforesaid vine lifting and guiding members at their inwardly extending ends.

6. A harvester for gathering peas and the like, comprising movable and inwardly converging yielding guide fingers extending upwardly from a point in proximity to the ground, and relatively fixed guide members arranged in spaced and substantially parallel relation over which the aforesaid converging and yielding guide fingers extend.

7. A harvester for gathering peas and the like, having an opening in the front thereof for receiving vines only through the advancing of the harvester, inclined movable vine lifting and guiding members, and relatively fixed guide members arranged horizontally on opposite sides of the aforesaid opening for receiving the vines from the said movable vine lifting and guiding members and retaining them in substantially a vertical position within the aforesaid opening preparatory to being threshed.

In testimony whereof I affix my signature, in presence of two subscribing witnesses.

WILLIAM Y. E. DAVIS.

Witnesses:
W. H. THOMPSON,
J. H. CURTIS.